United States Patent [19]

Cousino

[11] Patent Number: 4,931,890
[45] Date of Patent: Jun. 5, 1990

[54] TAPE PLAYER ASSEMBLY HAVING A CAPSTAN MOUNTED ON A PIVOTAL PLATE

[75] Inventor: Bernard A. Cousino, Fort Myers, Fla.

[73] Assignee: Cousino Microloop Corporation, Toledo, Ohio

[21] Appl. No.: 230,370

[22] Filed: Aug. 10, 1988

[51] Int. Cl.⁵ ............................................. G11B 15/00
[52] U.S. Cl. ...................................... 360/93; 360/105
[58] Field of Search .................. 360/93, 90, 96.5, 105, 360/96.3; 242/55.19 A, 55.19 R, 192

[56] References Cited

U.S. PATENT DOCUMENTS

| | | | |
|---|---|---|---|
| 2,911,215 | 11/1959 | Cousino | 242/55.19 A |
| 2,921,787 | 1/1960 | Cousino | 242/55.19 A |
| 2,922,642 | 1/1960 | Cousino | 242/55.19 A |
| 3,030,041 | 4/1962 | Cousino | 242/55.19 A |
| 3,420,461 | 1/1969 | Cousino | 242/55.19 A |
| 3,420,463 | 1/1969 | Cousino | 242/55.19 A |
| 3,438,591 | 4/1969 | Becker et al. | 242/55.19 A |
| 3,693,981 | 9/1972 | Ban | 360/105 |
| 3,787,057 | 1/1974 | Cailliot | 242/55.19 A |
| 3,879,694 | 4/1975 | Cousino et al. | 335/229 |
| 3,885,670 | 5/1975 | Cousino | 206/387 |
| 3,977,523 | 8/1976 | Cousino | 206/387 |
| 3,996,617 | 12/1976 | Cousino | 360/92 |
| 4,149,202 | 4/1979 | Terada et al. | 360/96.3 |
| 4,573,091 | 2/1986 | Barton, Jr. et al. | 360/93 |
| 4,586,095 | 4/1986 | Olmsted | 360/96.5 |

FOREIGN PATENT DOCUMENTS 2140961 12/1984 United Kingdom ................. 360/93

*Primary Examiner*—David J. Severin
*Attorney, Agent, or Firm*—Emch, Schaffer, Schaub & Porcello Co.

[57] ABSTRACT

A tape player assembly for a continuous loop magnetic tape cartridge is disclosed. The tape player assembly includes a housing having an opening for receiving the cartridge in a predetermined position. A plate member is pivotally mounted relative to the housing and supports a drive capstan adjacent the cartridge pressure roller. A motor drives the capstan and a transducer head is adjacent the predetermined position of the tape cartridge. A solenoid has a plunger connected to a cam member. Movement of the plunger rotates the cam member and pivots the plate member to space the drive capstan from the pressure roller.

8 Claims, 4 Drawing Sheets

TAPE PLAYER ASSEMBLY HAVING A CAPSTAN MOUNTED ON A PIVOTAL PLATE

BACKGROUND OF THE INVENTION

The present invention relates to a tape player assembly designed to serve as a play/record deck for a miniature magnetic continuous loop tape cartridge. One embodiment of the invention is small enough to fit into toys or stuffed animals, such as a twelve inch or fourteen inch teddy bear.

The tape player assembly, according to the present invention, has relatively few moving parts as compared with many prior art tape player assemblies.

The simplified tape player assembly, according to the present invention, has wide applications in the market place for message repeaters as used in airports, supermarkets, displays and exhibits, telephone systems, educational facilities, multilingual messages and radio spot announcements.

SUMMARY OF THE INVENTION

The present invention is directed to a tape player assembly for use with continuous loop magnetic tape cartridges. It is understood that various types of electronic systems and speaker systems, well known in the art, may be used with tape player assemblies. Such electronics are not a part of the present invention.

The tape player assembly, according to the present invention, includes a housing having a opening for receiving a continuous loop magnetic tape cartridge in a predetermined position. A plate member is pivotally mounted relative to the housing and supports a drive capstan adjacent the pressure roller mounted in the tape cartridge.

A motor is provided to drive the capstan. A transducer head is located adjacent the predetermined position of the tape cartridge. Drive means are provided for pivoting the tape member to space the capstan assembly from the pressure roller when the tape player is not being operated but when the cartridge still remains in its predetermined position.

DESCRIPTION OF THE PREFERRED EMBODIMENT

Figure 1:
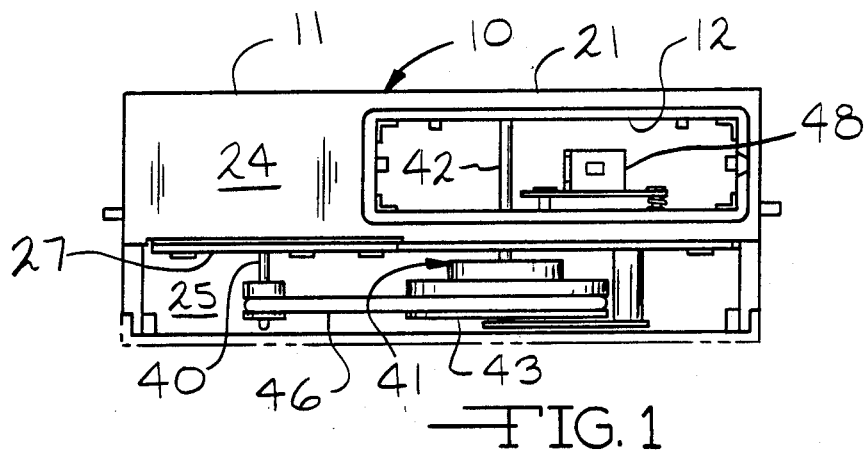
FIG. 1 is an elevational view of a tape player assembly, according to the present invention, with the drive means for pivoting the plate member removed for clarity.

A tape player assembly, according to the present invention, is generally indicated by the reference number 10. The tape player 10 includes a generally rectangular housing 11 defining a rectangular opening 12 for receiving a tape cartridge 13. The tape cartridge 13 is not a part of the present invention. The tape cartridge 13 is similar to the tape cartridge disclosed in my copending U.S. patent application Ser. No. 202,212, filed June 8, 1988. The tape cartridge 13 is a continuous loop magnetic tape cartridge which includes an integral pressure roller 15 and a pair of guide pins 16. The guide pins 16 guide a vertically disposed magnetic tape portion 17 past the pressure roller 15. The tape cartridge 13 also preferably includes recess 18 which extends completely around the cartridge.

Figure 2:
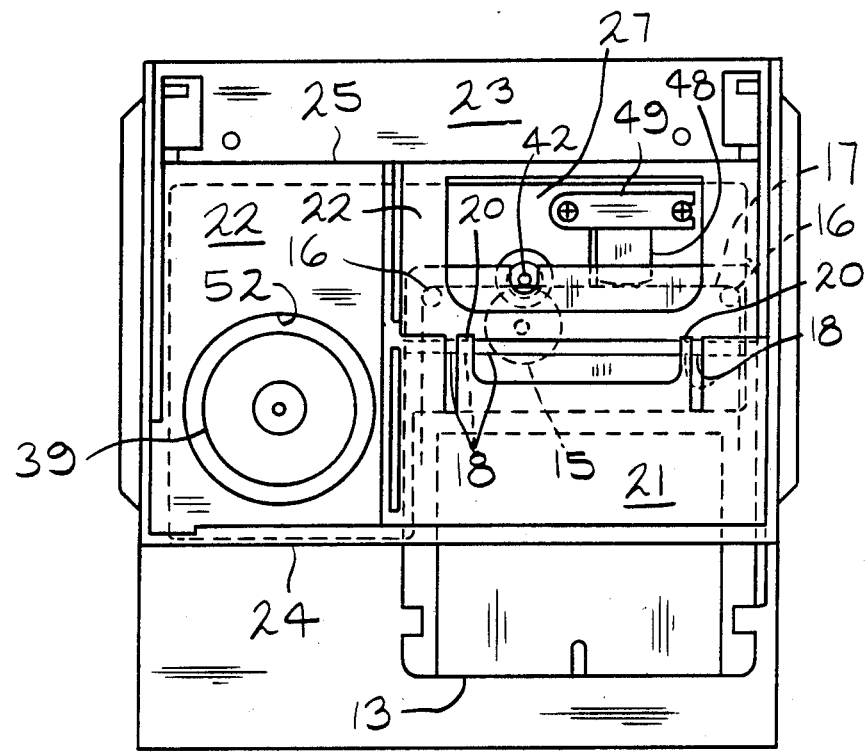
FIG. 2 is a top plan view of the tape player assembly shown in FIG. 1 and showing a continuous loop magnetic tape cartridge in a predetermined play position within the tape player assembly.

The housing 11 includes a plurality of finger members 20 which mate with the recess 18 to hold the tape cartridge 13 into a predetermined play position indicated in FIG. 2. The housing 11 includes a top 21, an intermediate horizontal floor 22 and a lower horizontal floor 23. The housing 11 also includes a front wall 24 which defines the opening 12 and a rear wall 25 in FIG. 3. A plate member 27 is pivotally mounted by a pivot pin 28 to the housing 11. Slotted openings 29 are provided in the plate member 27 in opposed relationship to the pivot pin 28. Fasteners 30 extend through the slotted openings 29 and are connected to the housing 11. A U-shaped spring 33 having legs 34 and 35 is connected by a fastener 36 to the plate member 27. The leg 34 is biased against the rear wall 25 of the housing 11 and the front leg 35 is retained in one of a series of openings 37 in the plate member 27. The spring 33 is a spring means which urges the plate member 27 to the FIG. 3 position. The spring force of the spring 33 may be adjusted by moving the spring leg 35 to individual ones of the openings 37.

Figure 4:
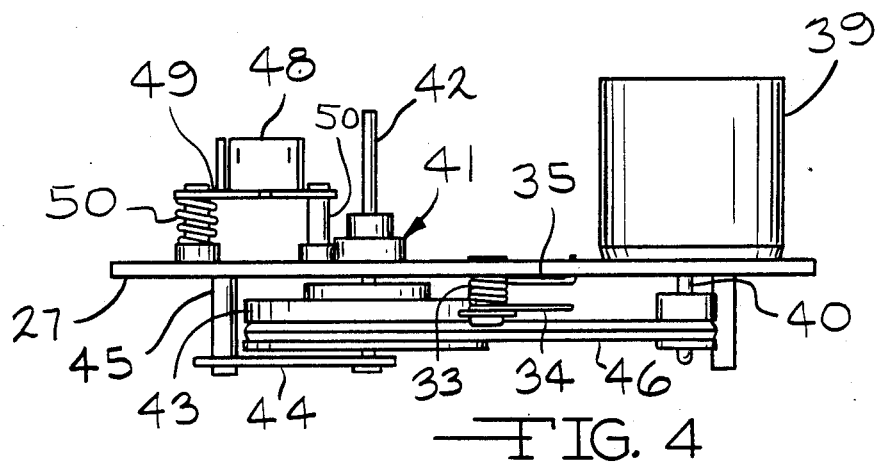
FIG. 4 is an elevational view, similar to FIG. 1, with the housing removed and the plate member rotated 180°.
Figure 5:
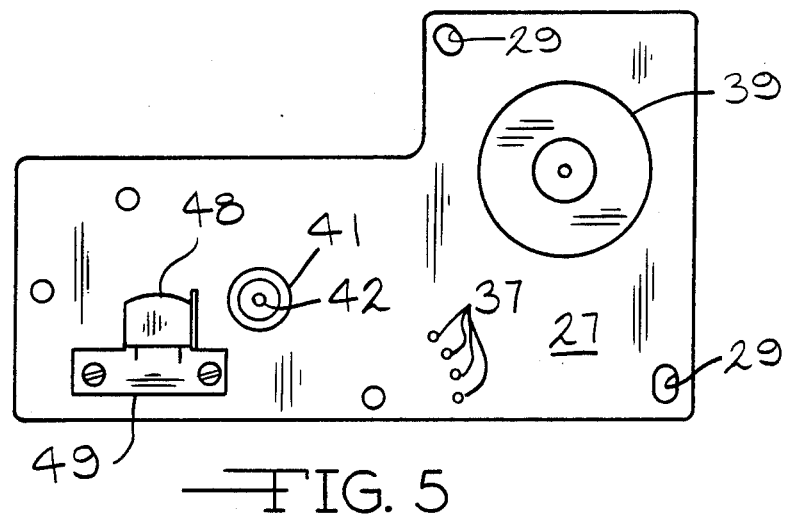
FIG. 5 is a top elevational view of the assembly shown in FIG. 4.

A motor 39 is mounted on the plate member 27 and has a drive shaft 40 (FIG. 4). A capstan assembly 41 is also mounted on the plate member 27 and includes an upper drive capstan 42 which engages the tape portion 17 and the pressure roller 15 to drive the magnetic tape through the tape player. The capstan assembly 41 mounts a low flywheel 43. A triangularly shaped mounting bracket 44 and connecting posts 45 secure the flywheel 43 and the capstan assembly 41 to the plate member 27. A drive belt 46 extends between the motor drive shaft 40 and the flywheel 43. Activation of the motor 39 rotates the drive shaft 40, the flywheel 43 and the drive capstan 42.

A transducer head 48 is mounted by a bracket 49 and posts 50 to the plate member 27. The transducer head 48 is mounted adjacent the predetermined position of the tape cartridge 13 such that the tape portion 17 passes the transducer head to receive the electrical signals from the tape.

A circular opening 52 is provided in the intermediate floor 22 of the housing 11 to receive the motor 39 which extends from the plate member 27 upwardly through the circular opening 52. The circular opening 52 has a diameter significantly larger than the diameter of the motor 39 so that the motor does not engage the floor 22 when the plate member 27 is pivoted.

One of the most frequent malfunctions in tape player assemblies is caused when the magnetic tape adheres to the pressure roller causing the tape to feed outwardly from the cartridge. This occurs most often in applications such as security or alarm devices that require instant play. When the drive capstan and the pressure roller remain in the play position where they are in engaged for a long period of time, the tape has a tendency to wind around the pressure roller or to feed outwardly from the cartridge.

Figure 6:
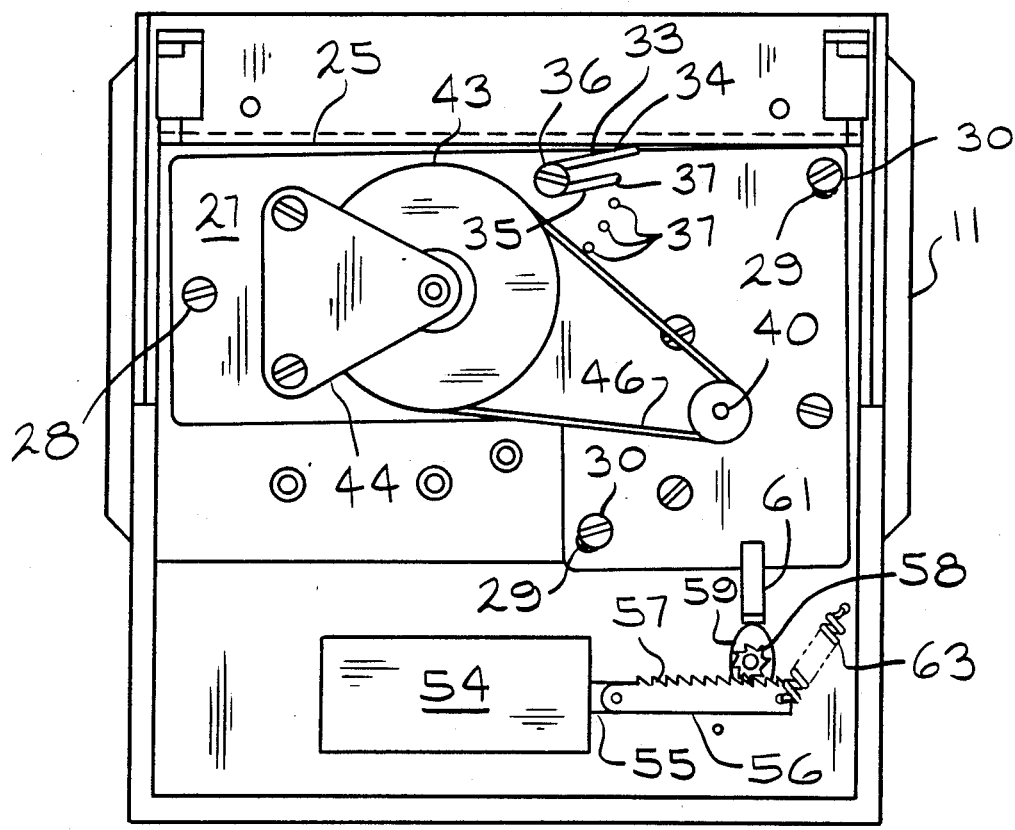
FIG. 6 is a view similar to FIG. 3 showing the plate member after it has been pivoted.
Figure 7:
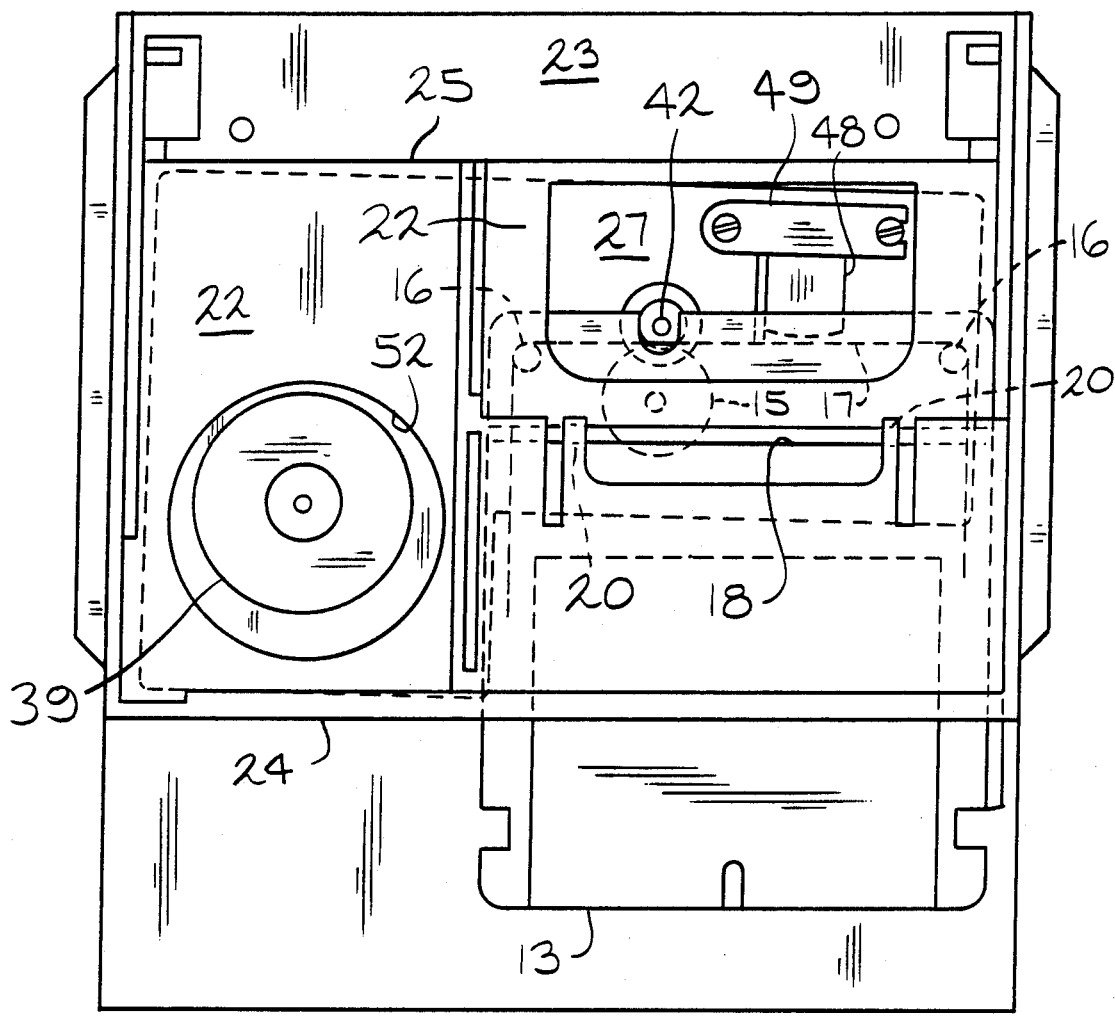
FIG. 7 is a top view similar to FIG. 2 after the plate member has been pivoted.

In the tape player assembly 10, according to the present invention, the above problem is solved. The plate member 27 pivots around the pivot pin 28 to move the drive capstan 42 slightly away from the cartridge pressure roller 15 when the unit is turned to the off position. When the unit is turned to the off position a solenoid 54 (FIG. 6) having a plunger 55 is energized. A longitudinally extending rachet member 56 having a series of rachet teeth 57 is connected to the plunger 55 and engages a gear 58 which is pinned to a cam member 59. An L-shaped bracket 61 has one leg connected to the plate number 27 and the other end in cooperating relationship with the cam surface of the cam member 59. When the solenoid 54 is energized, the plunger 55 is retracted. The rachet teeth 57 rotate the gear 58 and the cam member 59. The cam member 59 moves through a 90° rotation against the L-shaped bracket 61 and pivots the plate member 27 on the pivot pin 28 as shown by the direction of the arrow in FIG. 3. Completion of the pivoting action is shown in FIGS. 6 and 7. Referring specifically to FIG. 7, it is seen that the drive capstan 42 has moved slightly away from the tape portion 17 and the cartridge pressure roller 15.

Figure 3:
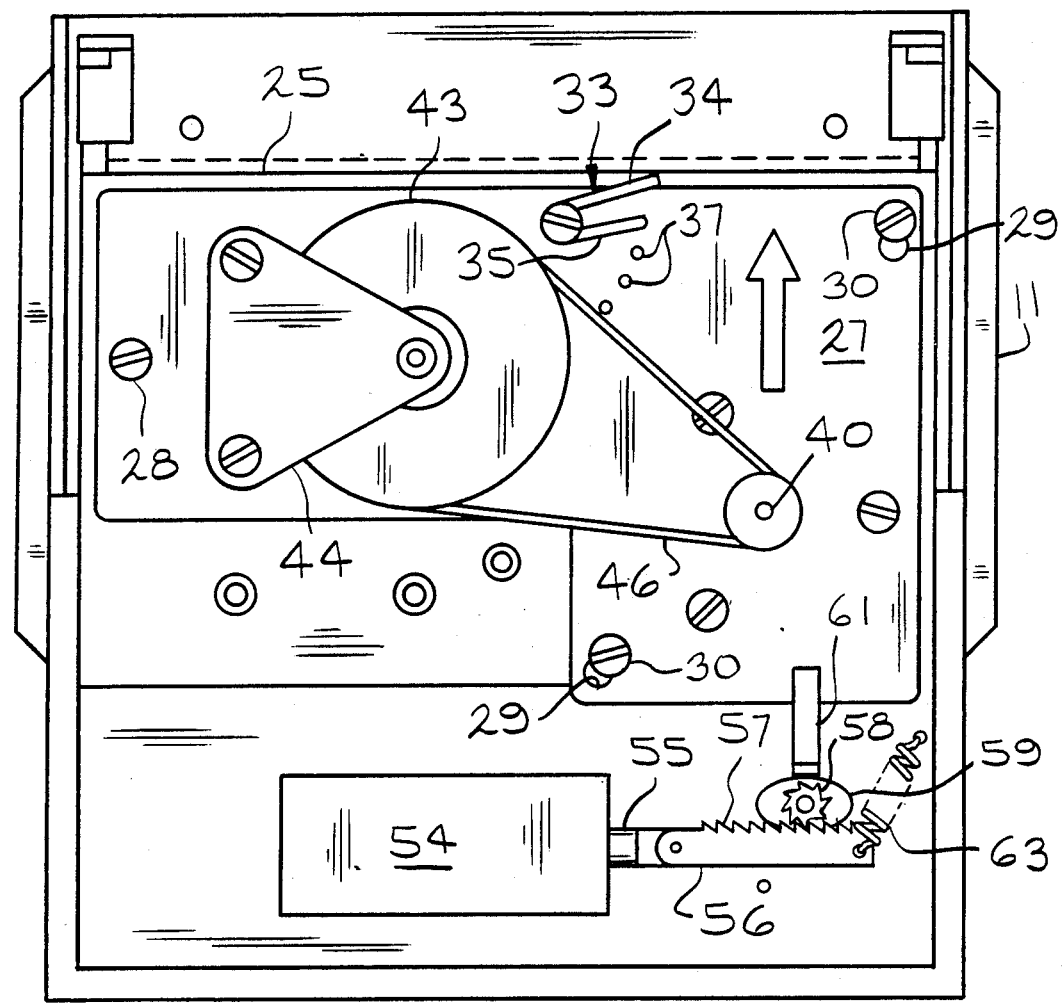
FIG. 3 is a bottom view of the tape player, similar to FIG. 2 shown on an elarged scale.

At this point, the force from a return spring 63 resets the teeth 57 and gear 58 back into an "at rest" or "pause" position, as shown in FIG. 3. This is accomplished by the angle on the teeth that provides engagement only on the power stroke from the solenoid 54. The cam member 59 is also moved to the FIG. 3 position. Return to the "play mode" is thus accomplished on the next power stroke when the solenoid 54 is energized. The U-shaped spring 33 provides sufficient torque to rotate the plate member 27 and hold it in position with the drive capstan 42 engaging the tape portion 17 and the pressure roller 15 for driving the tape across the transducer head 48.

Many revisions may be made to the tape player assembly 10 described above without departing from the scope of the following claims.

What I claim:

1. A tape player assembly for continuous loop magnetic tape cartridges comprising, a housing having an opening for receiving a tape cartridge in a predetermined position, such tape cartridge having a pressure roller, a plate member pivotally mounted on said housing, a transducer head positioned adjacent said predetermined position, a motor mounted on said plate member, a capstan assembly mounted on said plate member adjacent said predetermined position in an engaging relationship with such pressure roller, said capstan assembly being operatively connected to said motor, and drive means for pivoting said plate member whereby said capstan assembly can be spaced from such pressure roller when such tape cartridge remains in such predetermined position, said drive means comprising a drive solenoid having a plunger, a cam mounted adjacent said plate member and operatively connected to said plate member and connecting means between said plunger and said cam whereby movement of said plunger rotates said cam and pivots said plate member.

2. A tape player assembly, according to claim 1, wherein said transducer head is mounted on said plate member.

3. A tape player assembly, according to claim 1, including spring means between said housing and said plate member for pivoting said plate member to a position whereby said capstan assembly engages such tape cartridge pressure roller.

4. A tape player assembly, according to claim 1, wherein the cartridge includes a locking recess and a plurality of fingers extending from said housing for engagement with such cartridge locking recess.

5. A tape player assembly for continuous loop magnetic tape cartridges comprising, a housing having an opening for receiving a tape cartridge in a predetermined position, such tape cartridge having a pressure roller, a plate member pivotally mounted on said housing, a transducer head positioned adjacent said predetermined position, a motor mounted on said plate member, a capstan assembly mounted on said plate member adjacent said predetermined position in an engaging relationship with such pressure roller, said capstan assembly being operatively connected to said motor, and drive means for pivoting said plate member whereby said capstan assembly can be spaced from such pressure roller when such tape cartridge remains in such predetermined position, said drive means comprising a drive solenoid having a plunger, a cam mounted adjacent said plate member and operatively connected to said plate member and connecting means between said plunger and said cam whereby movement of said plunger rotates said cam and pivots said plate member, said connecting means comprising a longitudinally extending rachet member connected to said plunger, said rachet member having a series of rachet teeth along one edge, a gear mounted on said cam, said gear being engaged by said rachet teeth.

6. A tape player assembly, according to claim 5, including an L-shaped bracket extending from said plate member, said cam engaging said L-shaped bracket to pivot said plate member.

7. A tape player assembly, according to claim 5, including spring return means operatively connected to said rachet member.

8. A tape player assembly, according to claim 5, wherein the cartridge includes a locking recess and a plurality of fingers extending from said housing for engagement with such cartridge locking recess.

* * * * *